Feb. 24, 1970   J. PERRELLI   3,496,705
METHOD OF HARVESTING FRUIT
Filed March 22, 1967
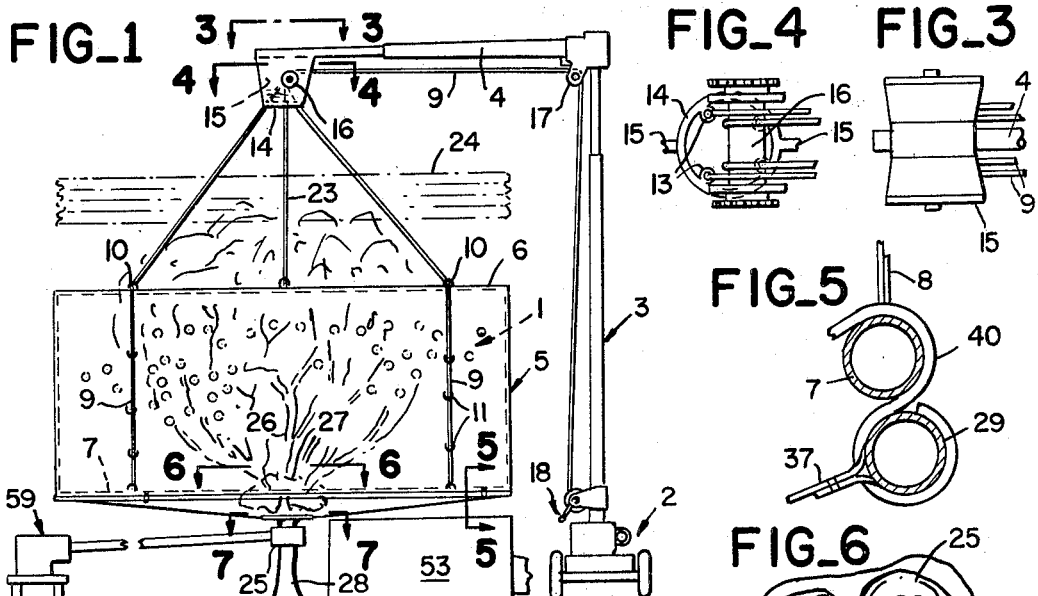
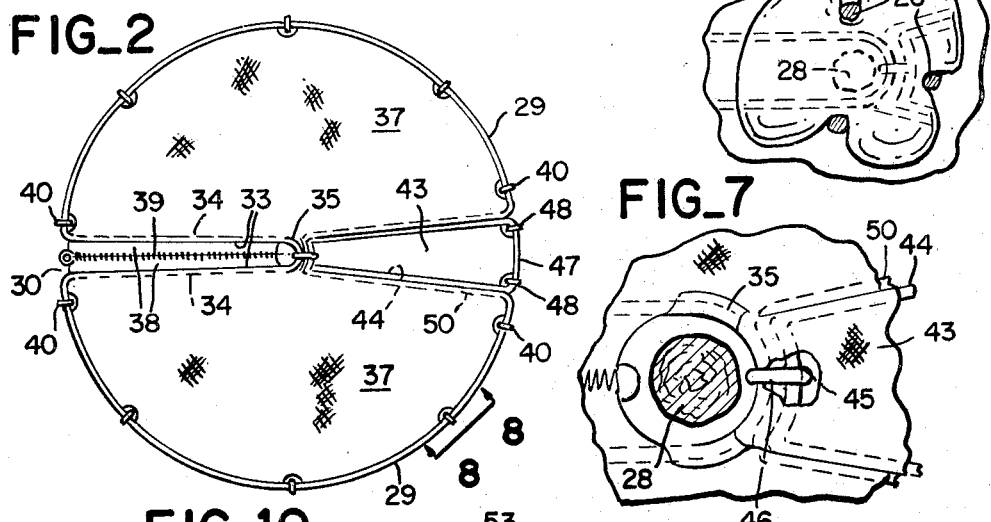
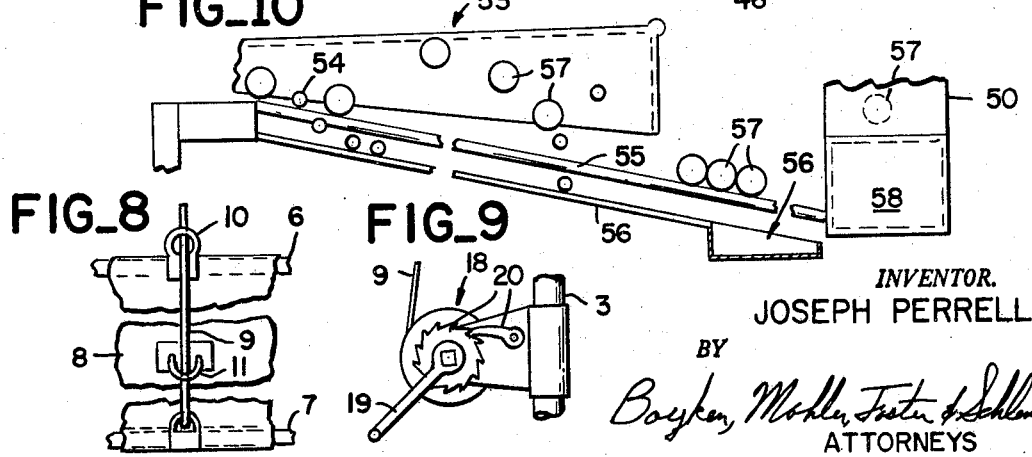
INVENTOR.
JOSEPH PERRELLI
BY
Boyken, Mohler, Foster & Schwemer
ATTORNEYS United States Patent Office 3,496,705
Patented Feb. 24, 1970

3,496,705
METHOD OF HARVESTING FRUIT
Joseph Perrelli, 995 Arlington Ave.,
El Cerrito, Calif. 94530
Filed Mar. 22, 1967, Ser. No. 630,172
Int. Cl. A01g *19/00, 19/04, 19/06*
U.S. Cl. 56—1                6 Claims

ABSTRACT OF THE DISCLOSURE

An enclosure is supported around the fruit-bearing portion of a tree, said enclosure having a bottom wall of flexible material extending to the trunk. The enclosure is filled with light-weight balls to approximately the upper end of the enclosure to enclose the fruit and branches. The fruit is then separated from the branches by agitation and progressively moves downwardly through the mass of balls to the bottom of the enclosure for collection and transfer to a desired point.

BACKGROUND

Heretofore, substantially all delicate fruit, other than prunes, has been hand picked to avoid injury to the fruit from striking the limbs, or each other, or the ground, as would occur were the tree merely shaken to permit the fruit to freely drop under the influence of gravity.

Attempts to catch the fruit on a canvas or the like, supported above the ground, does not overcome injury to the fruit from striking each other on the canvas or from striking the limbs or branches during falling.

Hand picking is slow, expensive, and experienced pickers are becoming unavailable when the fruit is ready for harvesting.

FIELD OF INVENTION

The benefits of the present invention are enjoyed wherever fruit, such as peaches, apricots, plums, apples, and the like are likely to be injured through impact with each other or with the branches of trees or the ground, in free falling under the influence of gravity, and where it is desired that such injury be avoided.

SUMMARY

In the present invention the light weight balls are preferably of non-moisture absorbent, moisture-proof plastic having a non-abrasive smooth outer surface and of a specific gravity substantially less than that of the fruit to be harvested.

The fruit may be separated from the tree by use of a conventional tree shaker or the body of balls surrounding the fruit may be agitated, or a combination of shaking the tree and agitating the body of balls may be employed, but however the fruit is separated, it will move progressively downward through the mass of balls to the bottom of the enclosure under the influence of gravity, but the descent will be less than the rate at which the fruit would fall if no resistance were encountered, and this rate is insufficient to result in any damage to the fruit.

The fruit, having collected below the mass of balls, is readily removed from the latter for transporting or processing and the balls and enclosure are adapted to be used in harvesting fruit on other trees.

BRIEF DESCRIPTION OF THE DRAWINGS

In the drawings, FIG. 1 is a simplified side-elevational view showing a tree with the enclosure suspended in position around it and a shaker connected to the tree.

FIG. 2 is a top plan view of the bottom wall of the enclosure for the balls, said wall being shown separate from the portion thereabove.

FIG. 3 is an enlarged fragmentary plan view of a portion of the device as seen from line 3—3 of FIG. 1.

FIG. 4 is an enlarged fragmentary cross-sectional view taken along line 4—4 of FIG. 1.

FIG. 5 is an enlarged fragmentary cross-sectional view taken along line 5—5 in FIG. 1 showing one of the connections between the bottom and side walls of the enclosure.

FIG. 6 is an enlarged fragmentary cross-sectional view taken along line 6—6 of FIG. 1 showing the pillow in the crotch of the tree.

FIG. 7 is an enlarged fragmentary cross-sectional view taken along line 7—7 of FIG. 1.

FIG. 8 is a fragmentary side-elevational view of a portion of the outer side of the vertical enclosure walls, showing one of the brails.

FIG. 9 is a fragmentary side-elevational view of the windlass connected with the brails.

FIG. 10 is a fragmentary cross-sectional view through the separator below the enclosure for separating the balls from the fruit.

DESCRIPTION OF PREFERRED EMBODIMENT

In detail, a fruit tree (FIG. 1) is generally designated 1, which tree may be a peach, apricot, plum, apple, or any other fruit tree by which the benefits of the invention may be obtained through its use.

Any suitable vehicle 2 is adapted to support a crane 3 alongside a tree, which crane includes a boom 4 adapted to extend over the tree 1 spaced above the latter. The boom is preferably vertically movable to different heights, and longitudinally extensible to different distances, this structure being conventional in many cranes.

The crane 3 supports a vertically disposed tubular enclosure 5 in a position with the vertically extending walls of the enclosure around the fruit-bearing portion of the tree 1.

The enclosure itself comprises a rigid annular upper ring 6 and a rigid annular lower ring 7, the two rings being of substantially the same size, and preferably of a diameter larger than the maximum diameter or horizontal dimension of the fruit-bearing portion of the tree 1. These rings are secured to the upper and lower edges of the tubular wall 8 of the enclosure, and said walls are preferably of flexible sheet material, such as fabric or plastic.

Secured to the lower ring 7 at equally spaced points therearound are ropes 9 (FIGS. 1, 8) that extend vertically upwardly from ring 7 along the sides of enclosure 5 to ring 6 and through eyes 10 secured on ring 6. Said ropes also extend through loops 11 (FIG. 8) that are secured to the side walls 8. From the eyes 10, said ropes 9 extend convergently upwardly through eyes 13 on a horizontal ring 14 (FIG. 4) that is rigidly secured by bracket arms 15 to the outer end of boom 4, in a position spaced below said outer end.

After passing through eyes 13, said ropes extend over a pulley 16, also carried by boom 4 and in a position between the outer end of the boom and ring 13, and from said pulley said ropes 9 extend horizontally to and over a second pulley 17 adjacent to the juncture between boom 4 and the mast of the crane. From pulley 17 said ropes 9 extend downwardly and over a windlass 18 (FIG. 9) on the lower end of said mast, which windlass includes a manually actuatable handle 19 for winding and unwinding ropes 9, the windlass being provided with a conventional ratchet and pawl combination 20 for releasably holding the drum of the windlass from unwinding.

Also, a pair of ropes 23 (FIG. 1) at opposite sides of the ring 6, connect the ring 7 with upper ring 14 to support the upper ring 6 at its lowermost level when ropes 9 are unwound. Ropes 9 are brails that initially collapse the enclosure walls 8 when the ropes 9 are wound on the windlass 18 and that also elevate the collapsed enclosure to the dash-dot line position 24. The ratchet-pawl combination 20 will hold the enclosure in its collapsed position and upon release of the windlass, the collapsed enclosure will be lowered to the extent permitted by ropes 23 and further unwinding of ropes 9 will result in the enclosure being expanded to the full line position shown in FIG. 1.

When the enclosure is in the expanded position shown in FIG. 1 or at any time prior to closing the lower end of the enclosure, a large pillow 25 is placed in the crotch of the tree 1, which pillow is filled with any suitable material that will cause it to readily sag between the main branches 26 (FIG. 6) and to partially wrap around said branches, leaving a dome-like upper surface 27 (FIG. 1) onto which fruit is adapted to be lowered, and then diverted off the pillow to the sides. This pillow is quite large, and extends a substantial distance outwardly of the trunk 28 of the tree.

The bottom of the enclosure 5 comprises a rigid ring-like member 29 (FIG. 2) that is provided with a gap 30 in one side opening into a slot 33 formed by spaced radially inwardly projecting extensions 34 on the member 29 at the sides of said gap, said extensions being connected by a U-connection 35 (FIG. 7) at their inner ends. The space between the extensions is wider than the maximum diameter of the trunk 28, and the closed U-connection 35 is past the center of the member 29. By this structure the horizontally disposed member 29 is adapted to be positioned directly below the tree 1 with member 29 coaxial with ring 7 of the enclosure 5 by passing the trunk 28 into slot 33.

A canvas 37, or other suitable flexible sheet material, is secured to the ring member 29 and extensions 34 and flaps 38 along said extensions may be connected by a zipper 39 or any other suitable means after the bottom closure comprising member 29 and the wall 37 are in position below the tree.

The member 29 is of substantially the same diameter as ring 7, and is adapted to be releasably connected with the ring 7 by hooks 40 (FIG. 5) rotatably carried by the ring 29 at spaced points around the latter.

A segment 43 of the bottom wall 37 (FIGS. 2, 7) extending from one side of ring 29 to the U-connection 35 is separate from the main body of canvas 37, and is carried by a frame 44 defining the outline of the segment which is radially elongated. The inner end 45 of frame 44 includes a downwardly directed hook 46 adapted to hook over the U-connection 35, while the outer end 47 (FIG. 2) of the frame 44 carries hooks 48 identical to the hooks 40 and that are adapted to releasably engage the lower ring 7.

Normally the bottom wall 37, including segment 43, slopes downwardly toward the trunk and it is to be noted that the U-connection 35 and inner end 45 of the segment 43 are below pillow 25.

Radially extending frame members 50, to which bottom wall 37 are secured, extend between member 29 and the U-connection 35 (FIG. 7) and along the longitudinally extending edges of segment 43 defined by frame member 44.

By the foregoing structure, none of the fruit or balls deposited on the bottom wall 37 will escape until the flaps 38 are disconnected or the hooks 48 on segment 43 are released. Thus, either one or two openings at one or at opposite sides of trunk 28 may be provided for discharge of fruit and balls onto any suitable receiver positioned therebelow, for subsequent separation of the fruit and balls.

FIG. 10 is illustrative of one type in which a separator generally designated 53 is provided below segment 43, or it may be positioned below the slot 33. Upon opening the space occupied by segment 43, or disconnecting flaps 38, according to the position of the separator, most of the fruit will be discharged first, inasmuch as it has collected below the mass of balls, and this fruit as indicated at 54 will pass between parallel horizontally spaced downwardly inclined rods 55, such as are conventional in graders, and will be conducted away on a conveyor 56, while the balls 57 being substantially larger than the fruit bodies 54 will continue down rods 55 for discharge in the lower end of a conventional air jet conveyor 58 for transfer to another tree enclosed by an enclosure 51 and for discharge into the upper open end of such enclosure, to repeat the process.

The fruit itself may be shaken from the tree, after the enclosure has been filled with balls, by any suitable tree shaker generally designated 59, such as used for shaking prunes and walnuts from trees. The present invention is not to be considered restrictive to any particular type of vibrator or vibration employed as long as the fruit is separated from the tree by other than manual picking, and which fruit would be free to fall without resistance were it not for the balls surrounding the fruit.

In the present instance, the mass of balls may be vibrated or moved relative to the fruit on the branches to facilitate separation, by actuating the ropes 9 to raise and lower the body of balls relative to the tree. Thus, whether the tree is shaken or the body of balls is agitated, the fruit bodies will be moved relative to the branches with which they are attached, and those sufficiently ripe to be loosened by such vibration or movement, will be separated, and will automatically move downwardly through the mass of balls to the bottom wall 37 or collection area.

From the foregoing, the method involved may be said to include the steps of substantially simultaneously separating whole fruit bodies of predetermined ripeness from the branches of a tree and thereafter lowering said fruit bodies, so separated, through the tree and past the branches to a collection area below said branches, and obstructing free falling of said fruit bodies under said influence substantially immediately after said separation of the fruit bodies from said tree and during movement thereof to said collection area to a rate of speed that is relatively slow compared to the rate of speed of free and unobstructed falling of said fruit bodies under said influence, and that is insufficient to result in injury to said fruit bodies due to impact with each other and with the branches of said tree during said lowering of said fruit bodies.

While a particular embodiment of the present invention has been shown and described, it will be obvious to one skilled in the art that the details as set forth are capable of modification, variation and substitution without departing from the spirit of the invention.

I claim:
1. A method of harvesting whole fruit bodies from a tree that includes the steps of:
 (a) separating said bodies, independently of manual handling, from the branches within said tree for downward movement of said bodies under the influence of gravity, through said tree and past said branches, to a collection area below said branches;
 (b) supporting said bodies substantially from the moment of their separation from said branches by and between the surfaces of discrete elements interposed between said bodies and said area and movable under the weight of said bodies to permit downward movement of the latter until they reach said area at a rate of movement that is insufficient to result in injury to said bodies from impact with each other and with said branches, and which latter rate is substantially less than the normal rate at which unsupported fruit bodies would freely fall under the inuuence of gravity upon separation from said branches.

2. A method of harvesting whole fruit bodies from a tree that includes the steps of:
  (a) separating said bodies, independently of manual handling, from the branches of said tree for downward movement of said bodies under the influence of gravity, through said tree and past said branches, to a collection area below said branches;
  (b) supporting said bodies substantially from the moment of their separation from said branches until they reach said area during said downward movement at a rate of movement that is insufficient to result in injury to said bodies from impact with each other and with said branches, and which latter rate is substantially less than the normal rate at which unsupported fruit bodies would freely fall under the influence of gravity upon separation from said branches;
  (c) said step of supporting said bodies for said downward movement being effected by supporting a mass of substantially adjoining ball-like objects of substantially less specific gravity than that of said bodies between each of said bodies and said area and through which mass said bodies are adapted to work their way downwardly under said influence of gravity.

3. A method of harvesting whole fruit bodies from a tree that includes the steps of:
  (a) separating said bodies, independently of manual handling, from the branches of said tree for downward movement of said bodies under the influence of gravity, through said tree and past said branches, to a collection area below said branches;
  (b) supporting said bodies substantially from the moment of their separation from said branches until they reach said area during said downward movement at a rate of movement that is insufficient to result in injury to said bodies from impact with each other and with said branches, and which latter rate is substantially less than the normal rate at which unsupported fruit bodies would freely fall under the influence of gravity upon separation from said branches;
  (c) enclosing the sides and bottom of the fruit bearing portion of said tree prior to said separation of the fruit bodies from said branches, and substantially filling the area so enclosed with said ball-like objects, in which the latter are of substantially less specific gravity than the specific gravity of said bodies, thereby providing a mass of said objects between said bodies and the area below said fruit bearing portion, and thereafter
  (d) agitating said branches and said mass of balls, relatively for so separating said bodies from said branches for said downward movement of said bodies through said mass of objects.

4. A method of harvesting whole fruit bodies from the branches of a tree that includes the steps of:
  (a) enclosing the fruit bearing portion of said tree to provide an enclosure having side walls extending around said portion and a bottom wall below said portion;
  (b) substantially filling said enclosure to a level above the major portion thereof with a mass of discrete objects of substantially less specific gravity than that of said bodies and which objects have smooth, rounded outer surfaces in engagement with said branches and said bodies for downward movement of said objects upon agitation of said objects and bodies relatively when said bodies are separated from said branches;
  (c) separating said bodies from said branches for said downward movement;
  (d) withdrawing said bodies and said objects from below said fruit bearing portion of said tree, and thereafter,
  (e) separating said objects from said bodies.

5. The method as defined in claim 4, wherein
  (f) said step of separating said bodies from said branches being effected by agitating said branches whereby said objects are agitated and said bodies are separated from said branches.

6. The method as defined in claim 4, that includes the step of;
  (g) agitating said objects after separation of said bodies from said branches for effecting displacement of objects below said bodies under the influence of gravity to cause progressive downward movement of said bodies to said bottom wall.

References Cited

UNITED STATES PATENTS

| | | | |
|---|---|---|---|
| 1,253,554 | 1/1918 | Wisnyei et al | 56—329 |
| 1,312,967 | 8/1919 | Ferry | 56—329 |
| 1,732,127 | 10/1929 | Helsel | 56—329 |
| 3,114,998 | 12/1963 | Weisser | 56—329 |
| 3,203,159 | 8/1965 | Weygandt et al. | 56—1 |

RUSSELL R. KINSEY, Primary Examiner

U.S. Cl. X.R.

56—328